Nov. 23, 1926.  1,608,172
J. HERR
TRACTOR CONNECTION WITH SEED HARVESTING AND CLEANING MACHINE
Filed Sept. 17, 1925
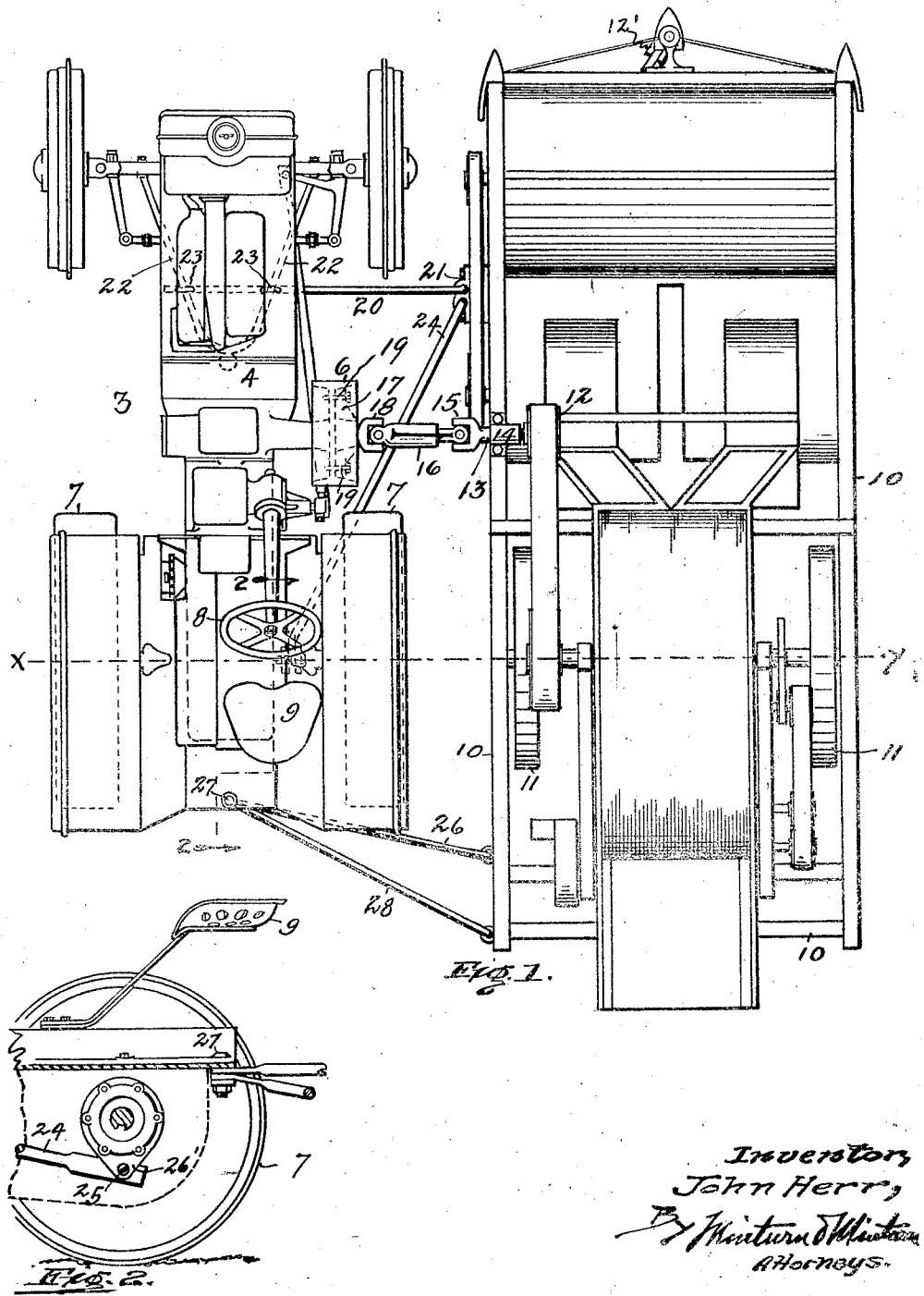

Patented Nov. 23, 1926.

1,608,172

UNITED STATES PATENT OFFICE.

JOHN HERR, OF LEBANON, INDIANA.

TRACTOR CONNECTION WITH SEED HARVESTING AND CLEANING MACHINE.

Application filed September 17, 1925. Serial No. 57,042.

The object of this invention is to provide adequate means for attaching a machine, for example, as the one here shown, for harvesting and cleaning seeds, such as clover, bluegrass, and the like seeds, to the side of a tractor such as is in common use on farms.

A seed harvesting and cleaning machine such as I now have in mind is illustrated and described in my application for patent, Serial No. 39,368, filed June 24, 1925, but machines for other purposes may be substituted and an object of importance is so to retain it at the side of the tractor that power to operate its mechanism may be taken from the tractor-side from the usual power delivery there without any interruption caused by difference of ground level over which the two machines may be passing. Another object is to so take the power from the tractor that it will be delivered to the harvesting and cleaning machine independently of the drive which moves the machines across the field, and to provide means whereby the harvesting and cleaning mechanism may be operated at different speeds subject to the control of the operator.

Another object is to provide a flexible side hitch of the harvester and cleaner to the tractor such that a combined push and pull action will be delivered from the tractor to the other machine over all land surface conditions. The object, also, is to maintain the axle of the rear ground contacting wheels of the harvester and cleaner in alinement with the axle of the rear wheels of the tractor to prevent the dragging of the wheels and to insure their rolling action in turning corners.

A still further object is thus so to place the harvester and cleaner mechanism close beside the driver of the tractor, that he will be able to superintend the operation of same and thereby dispense with the services of a separate attendant for that purpose.

I accomplish all of the above objects and such others as will hereinafter appear, by the mechanism illustrated in the accompanying drawing, in which—

Fig. 1 is a top plan view of a farm tractor with my seed harvester and cleaning machine operatively attached thereto, and Fig. 2 is a sectional detail on the line 2—2 of Fig. 1.

A tractor 3, more or less conventionalized, as the use of any suitable tractor is contemplated, has an engine 4, side belt pulley 6, driven therefrom, rear ground wheels 7 also driven from the engine, and a steering wheel 8 conveniently located near the rear of the tractor, in front of a driver's seat 9. All of these parts are of usual and suitable construction.

Located alongside the tractor, here shown at the right hand side thereof, which is usual, but not mandatory, is my seed harvesting and cleaning machine, having a main frame 10, generally rectangular in shape, and here shown as mounted on rear traction wheels 11, 11, and a front caster-wheel 12'.

It is unnecessary here to show or describe the harvesting and cleaning mechanism in detail and reference is therefore made to my said pending application for patent for those particulars. The said mechanism is driven by suitable belt transmission from a main pulley 12, on a shaft 13 journalled in a box 14, supported from the frame 10.

The outer end of shaft 13 is angular in cross section and between this outer part and box 14 is a universal joint 15. The angular end of shaft 13 telescopes with a sliding fit in the correspondingly shaped bore of a hollow shaft 16. The shaft 16 is connected with a spider 17 by a universal joint 18, and the spider 17 is secured by clips 19 to the arms of the pulley 6 on the tractor driving shaft. Other ways of coupling to the drive-shaft of the tractor will suggest themselves to a mechanical engineer and may be used without departing from the spirit of my invention, but the two universal joints or their equivalent and a telescoping shaft or its equivalent, are necessary to allow for variations in level and distances apart of the tractor and seed machine in their travel together over uneven ground surfaces. The exact mechanism for securing the required adjustments are not of the essence of this invention.

I will now describe the mechanism by which the harvesting and cleaning machine is so attached to the tractor as to be held thereto with their rear axles in a vertical plane through the dotted lines $x$—$y$, subject however to a limited vertical adjustment to variations in the ground surface travelled over.

A front holding or stabilizing bar 20 has one end bent and threaded and inserted through a hole in a plate 21, from which removal is prevented by a nut on the threaded end. The plate is rigidly fastened to frame 10. The bar crosses the two front radius rods 22, 22, of the tractor and is fixed thereto by clips 23.

A holding and backing bar 24 has one end attached to plate 21, in the same manner as described for bar 20, and extending thence diagonally to the rear the other end of bar 24, previously flattened and perforated, is fastened by a pin 25 between the ears 26' to which the usual rear draw bar is fastened, said draw bar being previously removed.

A rear holding and stabilizing bar 26 has one end bent and bolted to an eye on frame 10. The other end of bar 26 is flattened and perforated and is secured to a bolt 27, from which the draw-bar adjusting rod was detached and removed when the draw bar was removed.

A rear pulling (or pushing) bar 28 has one end bent and attached to an eye on frame 10 and has its other end flattened and perforated and fastened to the same bolt 27, to which the end of bar 26 is attached.

This completes the connection between the seed machine and the tractor, and while joining them securely for all practical purposes, and maintaining their rear axles in the same radial plane when turning in either direction, allows for the required flexibility between the two machines where uneven ground is travelled over.

While I have described my invention with more or less minuteness in connection with the form of tractor shown, it will be understood that the mechanism will be varied as I have in part suggested, to suit the different makes of tractors and other conditions. Therefore I contemplate all proper changes in form, construction, and arrangement, the omission of immaterial elements, and the substitution of equivalents as circumstances may suggest or as necessity may render expedient.

I claim:

1. The combination of a tractor, a vehicle located at the side of and spaced apart from the tractor to have the rear vehicle axle in the same vertical plane as that of the tractor rear axle, a front spacing bar normal to the longitudinal axis of both tractor and vehicle and pivotally secured by its ends to near the forward ends of the tractor and the vehicle, a front power bar pivotally secured to and extending from near the forward end of the vehicle diagonally across and back to be pivotally secured to near the rear end of the tractor, and a rear spacing bar pivotally interconnecting the rear end of the tractor with the side of the vehicle.

2. The combination of a tractor, a vehicle located at the side of and spaced apart from the tractor to have the rear vehicle axle in the same vertical plane as that of the tractor rear axle, a front spacing bar normal to the longitudinal axis of both tractor and vehicle and pivotally secured by its ends to near the forward ends of the tractor and the vehicle, a front power bar pivotally secured to and extending from near the forward end of the vehicle diagonally across and back to be pivotally secured to near the rear end of the tractor, a rear spacing bar behind the tractor axle pivotally interconnecting the rear end of the tractor with the side of the vehicle, and a rear power bar pivotally secured to and extending diagonally forward from the rear portion of the vehicle to be pivotally secured to the tractor.

3. The combination of a tractor, a vehicle at the side of and spaced apart from the tractor, said vehicle having a two wheeled rigidly mounted rear axle and a pivoted front wheel, a transverse bar pivotally attached to near the front of the vehicle and secured to near the front of the tractor substantially on the longitudinal axis of the tractor, a diagonal bar pivotally secured by its forward end to near the front of the vehicle and by its rear end to near the rear of and substantially on the longitudinal axis of the tractor, and a rear transverse bar pivotally secured to the vehicle and extending to the tractor to be pivotally secured thereto substantially on the longitudinal axis of the tractor.

4. The combination of a tractor, a vehicle at the side of and spaced apart from the tractor, said vehicle having a two wheeled rigidly mounted rear axle and a pivoted front wheel, a transverse bar pivotally attached to near the front of the vehicle and secured to near the front of the tractor substantially on the longitudinal axis of the tractor, a diagonal bar pivotally secured by its forward end to near the front of the vehicle and by its rear end to near the rear of and substantially on the longitudinal axis of the tractor, and a rear transverse bar pivotally secured to the vehicle and extending to the tractor to be pivotally secured thereto substantially on the longitudinal axis of the tractor, and a rear diagonal bar pivotally secured to the vehicle behind the rear transverse bar and extending forwardly to and pivotally secured substantially on the longitudinal axis of the tractor.

In testimony whereof I affix my signature.

JOHN HERR.